Oct. 15, 1968 R. J. ROSA 3,406,301
MAGNETOHYDRODYNAMIC HALL CURRENT GENERATOR
Filed Feb. 23, 1965 2 Sheets-Sheet 1

RICHARD J. ROSA
INVENTOR.

BY Alden D. Redfield
Melvin E. Frederick
ATTORNEYS

3,406,301
MAGNETOHYDRODYNAMIC HALL CURRENT GENERATOR

Richard J. Rosa, Reading, Mass., assignor to Avco Corporation, Cincinnati, Ohio, a corporation of Delaware
Filed Feb. 23, 1965, Ser. No. 434,341
14 Claims. (Cl. 310—11)

ABSTRACT OF THE DISCLOSURE

A magnetohydrodynamic Hall type generator and method of operating same having a disk-like configuration wherein a seeded and heated monatomic gas is passed through the generator at a pressure and magnetic field strength sufficient to produce nonequilibrium ionization. Segmented electrodes may be provided in the event they are required.

---

The present invention relates to magnetohydrodynamic (hereinafter referred to as "MHD") generators, and more particularly, to such generators that employ Hall currents to produce power.

In general terms, MHD generators produce electric power by movement of electrically conductive fluid relative to a magnetic field. The fluid employed is usually an electrically conductive gas from a high temperature, high pressure source. From the source, the fluid flows through the generator and, by virtue of its generally high velocity movement relative to the magnetic field, induces an electromotive force between opposed electrodes within the generator. The gas may exhaust to a sink, which may simply be the atmosphere; or, in more sophisticated systems, the gas may exhaust to a recovery system including pumping means for returning the gas to the source.

Several different gases may be used; for instance, the gas may simply be air, products of combustion, or may comprise inert gases, such as helium or argon. To promote electrical conductivity, the gases are heated to a high temperature and depending on the degree of conductivity desired or whether an inert gas is used, may be seeded with a substance that ionizes readily at the operating temperature of the generator. For seeding purposes, sodium, potassium, cesium, or an alkali metal vapor may be used. Regardless of the gas used an the manner of seeding, the resulting electrically conductive gases comprise a mixture of electrons, positive ions, and neutral atoms which, for convenience, may be termed "plasma."

In MHD generators, the plasma flows through a magnetic field which is directed perpendicular to the direction of plasma flow and the movement of the electrically conductive plasma relative to the field produces an E.M.F. that is normal both to the direction of flow of the plasma and the magnetic field. In any type of MHD generator, whether in a conventional type (the flow of Hall current is not desired and does not provide the useful output of the generator) or in a Hall current generator (the flow of Hall current is desired and does provide the useful output of the generator), current flow produced by the aforementioned E.M.F. is parallel thereto and this current flow must be present to produce any useful output. Depending on generator design, this current flow generally referred to as the "normal" current as distinguished from Hall current) can be between opposed electrodes or it can be closed on itself within the plasma. As a result of this current flow, a separation of positive and negative electrical changes occurs along the length of the plasma stream, producing a potential gradient generally referred to as either the "Hall potential" or "Hall field," which promotes current flow internally of the generator in the direction of plasma flow. In a conventional MHD generator, such current flow (generally referred to as Hall currents) causes energy losses which are detrimental to the operation of the generator, and various schemes have been devised to prevent their formation. It is possible, however, to build an MHD generator that takes advantage of the Hall potential, as in the present invention.

Since electrons are lighter than ions and hence have a higher mobility, they will, in general, carry most of the current in an MHD generator. Since the forces exerted by the magnetic field are exerted on the current carriers, the electrons naturally experience most of the forces arising from their movement in the field.

As already mentioned, an electron current (normal current) is induced between the electrodes by the cross product of the velocity V of the plasma and the magnetic field $B(V \times B)$. For the preferred arrangement where the velocity of the plasma is at right angles to the magnetic field, the cross product is equal to the arithmetical product of the vectors since the sine of the angle between them is one. The magnetic field acts on the current, creating a force tending to retard motion of the electrons longitudinally down the duct with the rest of the plasma. The ions, on the other hand, being much greater in mass than the electrons, only experience small forces as they move in the magnetic field and tend to be carried downstream with the plasma. Thus, the aforementioned separation of charges occurs, resulting in the creation of an electric field in the dierction of plasma flow. This electric field as previously noted is frequently called the "Hall field" since the phenomena involved are similar to those giving rise to the so-called "Hall effect" observed sometime ago in solid conductors.

The forces, acting on the electrons, are transmitted by them to the rest of the plasma particles by collisions and by the Hall field. Further, the movement of plasma particles is retarded by collision with the ions which, although carried downstream with the rest of the plasma, are held by the electric field existing between them and the upstream electrons. In overcoming the forces resulting from collisions with the ions and electrons, the plasma does work. This is as would be expected in a device for generating electrical power.

The idea of using the Hall potential in a generator in itself is not broadly new. For example, the Karlovitz et al. United States Patent 2,210,918 which issued on Aug. 13, 1940, entitled, "Process for the Conversion of Energy and Apparatus for Carrying Out the Processes," describes an early form of Hall current generator wherein normal currents induced in the plasma are allowed to close on themselves within the plasma. The device disclosed in the Karlovitz et al. U.S. patent is, however, characterized by large losses, both viscous and thermal, because of the large surface to volume ratio of the annular flow passage through which the working fluid passes. My more recent U.S. Patent 3,091,709 which issued May 28, 1963, entitled "Hall Current Generator," describes a different form of Hall current generator which is not subject to the shortcomings of the Karlovitz et al. generator, such as, for example, large viscous and thermal losses and difficulty in providing a strong magnetic field over an appreciable volume. As distinguished from the device disclosed in the aforementioned Karlovitz et al. patent, the device disclosed in my aforementioned patent utilizes opposed electrodes segmented in the direction of plasma flow and disposed between the terminal electrodes utilized to tap the Hall potential produced by the flow of normal current between the opposed electrodes.

On the basis of theoretical analysis and experiments carried out during the development of this invention, I have found that in generators of the type disclosed in my aforementioned patent, it is not practically possible to obtain and utilize nonequilibrium ionization as may be done with the present invention. The same is equally true with respect to the Karlovitz et al. apparatus because of the practical inability to create a sufficiently strong and suitable magnetic field in an annular working chamber or duct. I have also found that generators which utilize electrodes which project into the plasma are equally unsatisfactory because of aerodynamic losses and local Hall effects introduced by this type of electrode. Theoretical analysis indicates that the aforementioned local Hall effects due to an electrode which projects into the plasma or electrically conductive gas, notwithstanding the fact that the electrodes may have infinitely fine longitudinal segmentation, will reduce generator power density or internal conductance.

Heretofore, the only way to obtain the degree of ionization needed for commercial MHD power generation, which is to say the generation of kilowatts to megawatts of electrical power, was to provide a hot working gas which has been seeded and heated to very high temperatures of the order of 5000° F.

Unfortunately, only burners using fossil fuels can achieve temperatures of the order of 5000° F. Accordingly, it has not been practically possible prior to the present invention to utilize a heat exchanger such as a nuclear reactor in an MHD generating system. For example, argon seeded with cesium does not become sufficiently ionized for MHD purposes below about 3500° F. and this temperature is still well beyond the capability of present day nuclear reactors.

The present invention, among other things, provides a solution to the above-noted impasse by the provision of a plasma sufficiently ionized for MHD purposes by means of nonequilibrium ionization, i.e., the electrons in the working gas are heated to energy temperatures above that of the ions and neutral atoms in the gas while requiring a gas temperature of only about 2900° F.

In its preferred embodiment, the present invention contemplates the use of a seeded and hot monatomic gas and a duct having a dis-like configuration. Whereas other types of duct configurations are not satisfactory for the reasons noted hereinabove, the disk-like configuration meets the requirements for nonequilibrium ionization without causing unacceptable electrical and aerodynamic inhomogeneties while simultaneously permitting the use of the most simple, economical and well known techniques for the provision of strong magnetic fields in the duct necessary to provide nonequilibrium ionization. In particular, the disk configuration permits the use of generally toroidal field coils disposed on the exterior and hence cool surface of the duct.

Briefly described, the preferred embodiment of the novel MHD generator of this invention, comprises a substantially disk-shaped duct having in one wall forming a part of the duct a central opening for receiving an electrically conductive gas or plasma whereby the electrically conductive gas enters the duct through the aforementioned central opening along a predetermined axis and substantially circumferentially passes through and leaves the duct in a direction substantially normal to the aforementioned predetermined axis. The electrically conductive gas is preferably comprised of a heated monatomic gas seeded with a substance ionizable at the operating temperature of the gas. A magnetic field normal to the direction of flow and through the electrically conductive gas in the duct is provided. Movement of the gas through the duct and the magnetic field induces in the gas current flow which is closed on itself and intermediate first electrode means exposed to the gas and carried by the duct adjacent the central gas inlet opening and second electrode means exposed to the gas, carried by the duct and radially displaced from the first electrode means in the direction of flow of the gas. The second electrode means preferably comprises a plurality of discrete electrodes electrically insulated one from another and the pressure and magnetic field strength within the duct is preferably selected to provide a high $\omega\tau$ where $\omega$ is the electron cyclotron frequency in radians per second and $\tau$ is the electron mean free time between collision with plasma particles in second.

In view of the foregoing, it will be apparent that a broad object of the invention is to provide an improved Hall current generator.

Another object of the invention is to provide a generator in which current flows longitudinally through the plasma passing through the generator to terminal electrodes which may be connected to an external circuit.

Another object of the invention is the provision of an MHD generator which is particularly adapted to permit nonequilibrium ionization of the plasma.

A still further object of the invention is a provision of an MHD generator capable of operating at high $\omega\tau$ with ionization frozen at the stagnation level.

A still further object of the invention is the provision of means in an MHD Hall current generator capable of running at high $\omega\tau$ with ionization frozen at the stagnation level which at least reduces the tendency of the plasma to break down and adversely affect the Hall potential.

A still further object of the invention is a provision of a Hall current generator utilizing nonequilibrium ionization in addition to conventional ionization (thermal ionization and seeding) wherein the tendency of the plasma to break down and produce undesirable effects is at least reduced.

The novel features that I consider characteristic of my invention are set forth in the appended claims; the invention itself, however, both as to its organization and method of operation, together with additional objects and advantages thereof, will best be understood from the description of the preferred embodiment when read in conjunction with the accompanying drawings in which:

Figure 1:
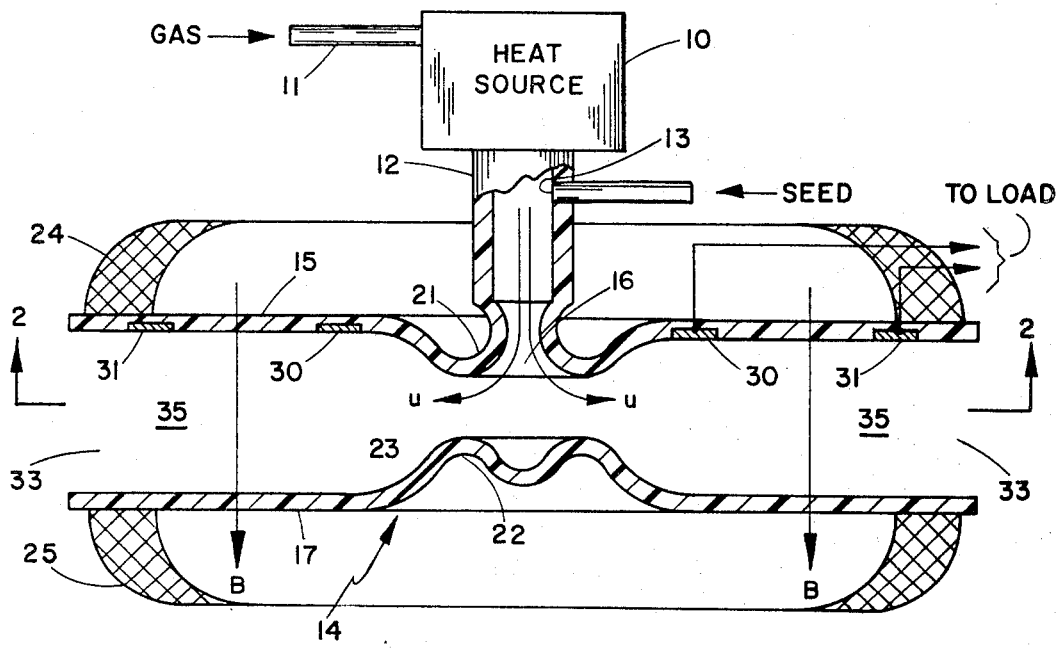
FIGURE 1 is a schematic side elevation partly in cross section of apparatus according to the invention and illustrates the basic construction and operation of such apparatus.
Figure 2:
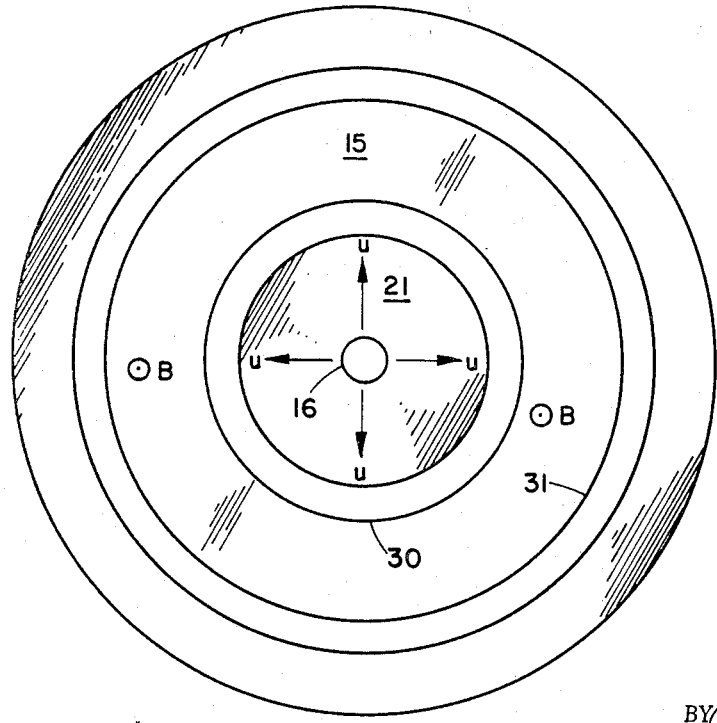
FIGURE 2 is a sectional view taken on line 2—2 of FIGURE 1.

Referring now to FIGURE 1 and FIGURE 2, there is shown a heat source 10 having a gas inlet pipe 11 for receiving a monatomic gas, heating the gas in conventional manner to a temperature of about, for example, 1500° K. to 2000° K., and exhausting the hot gas via a gas outlet pipe 12. An inert gas, such as argon, is preferred to provide nonequilibrium ionization. Due to the fact that only a portion of the gas passing through the heat source 10 may eventually become ionized and since it is obviously desirable to obtain the highest possible degree of ionization, an alkali substance is mixed with the gas in the outlet pipe 12 which also functions as a mixing chamber. Alkalis, such as cesium, sodium, potassium, etc., are preferred over other substances which may also be used because alkalis are noted for their relatively small ionization potential, which means that they readily become ionized.

The heat source 10 may be of a type that is well known and, hence, need not be described in minute detail here. For example, a fission reactor may be adapted for use herein, as may a pebble bed heater or a graphite heater. If a graphite heater is used, for example, its main components may comprise a large number of small graphite rods stacked vertically within a hollow graphite cylinder and means for heating the core to a temperature sufficient to produce the desired gas temperature of, for example, 2000° K. In any event, the gas is heated by passing it through the heat source and thereby heated to the heater temperature. As the heated gas leaves the heat source, it is mixed in pipe 12 or a plenum chamber as at 13 with an easily ionizable substance, i.e., one that is ionized at the working temperature of the gas. This hot, electrically conductive gas may then be introduced into the generator.

From the heat source, the electrically conductive gas is supplied to a disk-shaped duct designated generally by the numeral 14. The disk-shaped duct 14, which is the preferred configuration, is comprised of a first electrically nonconductive wall 15 having a central opening 16 for receiving the hot electrically conductive gas from the heat source 10. Pipe 12 is preferably as short as practically possible to maintain heat loss at a minimum. A second electrically conductive wall 17 oppositely disposed and spaced from wall 15 defines a generally disk-shaped duct. The walls 15 and 17 may be maintained in spaced relationship by any suitable means (not shown).

The majority of the walls 15 and 17, which define the working section 35 of the duct, are generally annular shaped, flat, and substantially co-planar. The walls 15 and 17 may be slightly divergent if desired to maintain a constant gas velocity in the working section of the duct.

The central portions 21 and 22 of respective walls 15 and 17 are deformed as best shown in FIGURE 1 to define a cylindrical nozzle 23.

Adjacent the outer periphery or circumference of each wall are field coils 24 and 25 for providing sufficient magnetic lines of flux through the working section 35 of the duct normal to the direction of gas flow therein. The direction of gas flow is indicated by the arrows $u$ and the direction of the magnetic lines of flux are designated by the arrows B.

Within the duct and exposed to the electrically conductive gas are provided first electrode means 30 adjacent the inner periphery of the duct or gas inlet 16 and second electrode means 31 displaced from the first electrode means 30 in the direction of gas flow, i.e., for example, adjacent and along the outer periphery of the duct which is to say the end of the magnetic field. Where the "spoke" effect, more fully discussed hereinafter, is not present or sufficiently serious to appreciably affect the efficiency of the generator, the first and second electrode means may be continuous rings of electrode material. Generally speaking, the innermost electrode functions as an anode to receive electrons and the outermost electrode functions as a cathode to emit electrons. Although it is not essential, anodes may be disposed in opposed relationship in walls 15 and 17 and electrically connected as by an external conductor to function as a single anode and cathodes may be disposed in opposed relationship in walls 15 and 17 and also electrically connected as by an external conductor to function as a single cathode.

The electrically nonconductive walls 15 and 17 may be made of any suitable electrically nonconductive material such as, for example, a ceramic or refractory material which is capable of withstanding the operating temperature of the electrically conductive gas. Where cooling of the walls is necessary as, for example, in large installations, the duct walls may be comprised of electrically insulated metal pegs. For a more comprehensive discussion of such a wall construction, reference is made to U.S. Patent No. 3,161,788. The electrodes may be made from many different materials both metals and non-metals, such as copper, stainless steel, tungsten, zirconia, etc. Depending on the temperature of the electrically conductive gas, the electrodes may be cooled as by internal circulation of coolant (not shown). Generally speaking, the anodes are cooled below electron emitting temperatures while the cathodes operate at a temperature sufficiently high to sustain continuous electron emission. For a more comprehensive discussion of suitable electrodes, reference is made to patent application Ser. No. 280,273, filed May 14, 1963.

While the working section 35 is shown as being supplied with the electrically conductive gas through the central portion 21, it will be understood that the electrically conductive gas can simultaneously be supplied to the working section 35 through the central portion 22 from either the same heat source or a second heat source.

Further, while a disk-shaped duct has been shown wherein the flow of gas in the working section 35 is in a plane normal to its direction of flow at the inlet of the duct, it is to be understood that the included angle between the mean direction of gas flow at the inlet of the working section and the mean direction of gas flow in the working section can exceed 90°. However, where the included angle substantially exceeds 90°, the difficulties involved in providing a suitable magnetic field having the necessary orientation with respect to the direction of gas flow and the disadvantages resulting therefrom become so great as to render such a configuration practically inoperative.

Radial movement of the electrically conductive gas uniformity about the circumference of the nozzle 23 to the outer periphery 33 of the working section 35 of the duct and, hence, movement through the magnetic lines of flux generates an electric potential which is proportional of the cross product of the velocity V of the gas and the magnetic field strength $B(V \times B)$. Under the influence of this potential, an electron current flows circumferentially in the duct. Due to the disk configuration of the duct, this current flow is not only annular and closed on itself but normal to the direction of the magnetic field and the direction of gas flow. This current flow, sometimes referred to as normal current flow, particularly in MHD generators having elongated or straight ducts and oppositely disposed electrodes to receive the normal current flow, gives rise to the aforementioned Hall potential between electrodes 30 and 31. Accordingly, current will flow through a suitable load if it is connected between electrodes 30 and 31.

The disk shape is particularly adapted for MHD machines operating at high $\omega\tau$ such as, for example, an $\omega\tau$ of 10 or more. The elongated or straight duct configuration is not suitable for high $\omega\tau$ operation (low gas pressure and high magnetic field strength in the duct) because of nonuniformities introduced by the opposed electrodes required by such a duct configuration. These nonuniformities are believed to be caused by the current concentrations which appear at the electrodes and also over the insulator between the electrodes at high $\omega\tau$. As a result, in gases where nonequilibrium ionization is expected (e.g. argon) such ionization will always occur first in a layer over these electrodes and nonuniformities of this type lead to rapid deterioration of performance in generators having a straight duct.

Turning now to a duct having an annular configuration, such as the Karlovitz et al. device wherein the magnetic lines of flux are normal to the longitudinal axis of the duct, it is extremely difficult, if not practically impossible, to provide the necessary magnetic field strength to provide high $\omega\tau$ operation. The disk-shaped configuration on the other hand does not require the oppositely disposed electrodes of the straight duct configuration and is particularly adapted to the provision of high strength magnetic fields such as those that can be provided by superconducting coils. Thus, the present invention permits operation of an MHD generator at high $\omega\tau$ with ionization frozen at the stagnation level, thereby producing Hall voltages of as much as four times $V \times B$. Prior art devices have not been able to achieve such results.

In experiments with a generator constructed in accordance with the present invention, appreciable nonequilibrium and enhancement of the power output due to $V \times B$ ionization occurred under conditions which corresponded very well with what would be predicted on the basis of electric field experiments and theory if the effects of radiation are included. Further, these experiments were carried out at pressures, temperatures, and ionization levels close to what is likely to be used in practice. Accordingly, it is believed that the atomic processes which dominated in the experiments are the same ones that would do so in a large size machine. Because the generator may operate at an $\omega\tau$ of 10 or more, as the free electrons in the gas enter the working section of the duct and hence encounter the magnetic field, they become greatly agitated and knock off bound electrons from some of the incoming neutral atoms. In this way, the gas ionization may be increased by a factor of ten over what it was when the gas entered the magnetic field. Still further, at the point of maximum power output, conductivity of the electrically conductive gas was about four times the equilibrium value and the power output was between two and two and one-half times the maximum expected at thermal equilibrium for the same degree of gas uniformity.

In conducting the above experiments, a peculiar effect was noted above about the point at which nonequilibrium ionization began, i.e., above the point of maximum thermal ionization. Above the point of maximum thermal ionization, the ionization process appeared to be unstable and resulted in a plurality of highly electrically conductive longitudinal streamers herein referred to for convenience as ionization "spokes." These spokes decreased the uniformity of the gas, and in effect, at least partially short circuited the Hall potential between electrodes 30 and 31.

Figure 3:
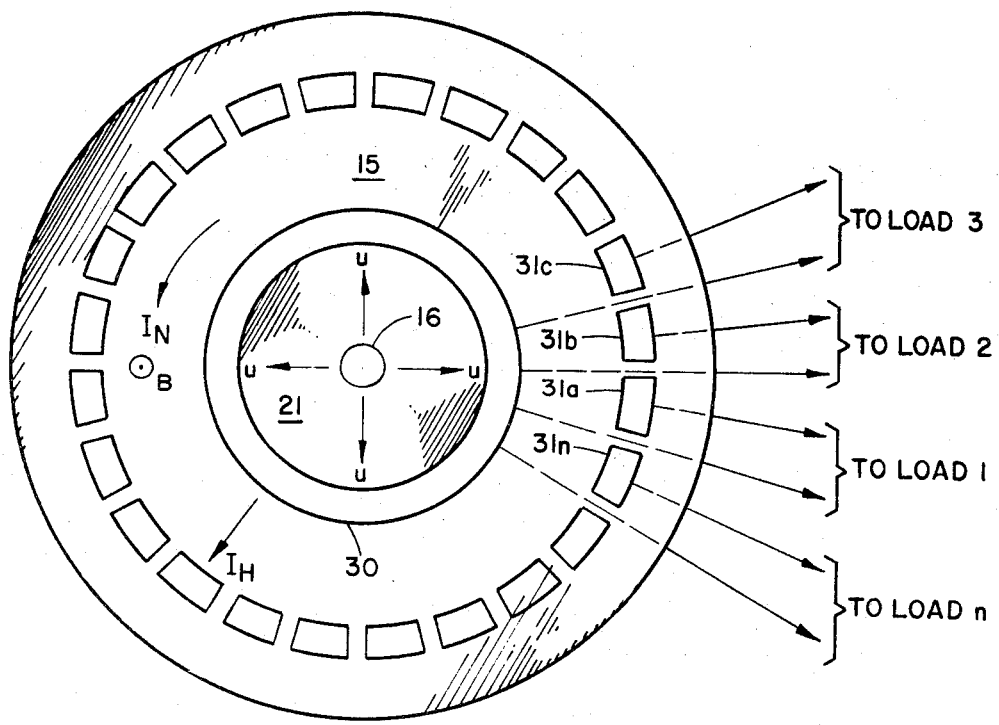
FIGURE 3 is a view similar to FIGURE 2 but utilizing electrode segments connectible to different loads.

In accordance with the invention, the tendency of the aforementioned ionization spokes to form may at least be reduced if not prevented by splitting the outer electrode 31 into a plurality of separate electrodes 31a, 31b, 31c. . . . 31n insulated one from another as shown in FIG. 3 and connecting separate loads between respectively the segmented outer electrodes and the inner electrode 30. The flow of normal current is suggested by the arrow $I_n$ and the flow of Hall current is suggested by the arrow $I_H$. The inner electrode 30 may also be segmented if desired although this is not essential. As a result of segmentation of the electrodes, the power for each load will be drawn from only a limited part of the generator, thereby making it more difficult for spokes to form or once formed to maintain themselves.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. In an MHD generator for generating electricity from a moving stream of electrically conductive gas, the combination comprising:
   (a) a duct for conveying said gas stream having an axial inlet portion for receiving said gas stream and a flared outlet portion for radially exhausting said gas stream uniformly about the circumference of said inlet portion at an angle of at least about 45° to its direction of travel in said inlet portion;
   (b) means for providing a magnetic field through said flared portion normal to the direction of travel of said gas therein;
   (c) first electrode means disposed at the inner periphery of said flared portion; and
   (d) second electrode means comprising a plurality of discrete electrodes electrically insulated one from another disposed at the outer periphery of said flared portion.

2. In an MHD generator for generating electricity from a moving stream of electrically conductive gas, the combination comprising:
   (a) a duct for conveying said gas stream having an axial inlet portion for receiving said gas stream and a flared outlet portion for radially exhausting said gas stream uniformly about the circumference of said inlet portion at an angle of about 90° to its direction of travel in said inlet portion;
   (b) means for providing a magnetic field through said flared portion normal to the direction of travel of said gas therein;
   (c) first electrode means disposed at the inner periphery of said flared portion; and
   (d) second electrode means comprising a plurality of discrete electrodes electrically insulated one from another disposed at the outer periphery of said flared portion.

3. In an MHD generator for generating electricity from a moving stream of electrically conductive gas, the combination comprising:
   (a) a duct for receiving said electrically conductive gas comprising first and second electrically nonconductive walls spaced one from another, each said wall having a central portion surrounded by an outer portion, said central portions and said outer portions being respectively oppositely disposed one from another, one of said walls having an inlet opening in its central portion for receiving said gas, the direction of gas flow between said outer portions being at an angle of at least about 45° from the direction of gas flow at said inlet opening;
   (b) means for providing a magnetic field through said outer portions normal to the direction of gas flow at said outer portions;
   (c) first electrode means exposed to said gas and disposed adjacent said inlet opening; and
   (d) second electrode means comprising a plurality of discrete electrodes electrically insulated one from another exposed to said gas and substantially circumferentially disposed at respectively discrete points displaced from said first electrode means in the direction of flow of said gas.

4. In a MHD generator for generating electricity from a moving stream of electrically conductive gas, the combination comprising:
   (a) a duct for receiving said electrically conductive gas comprising first and second substantially parallel electrically nonconductive walls spaced one from another, each said wall having a central portion surrounded by an outer portion, said central portions and said outer portions being respectively oppositely disposed one from another, one of said walls having an inlet opening for receiving said gas, the direction of gas flow between said outer portions being at an angle of about 90° from the direction of gas flow at said inlet opening; at least a part of the outer periphery of said outer portions comprising an outlet for exhausting said gas from said outer portions;
   (b) means for providing a magnetic field through said outer portions normal to the direction of gas flow at said outer portions;
   (c) first electrode means exposed to said gas and disposed adjacent said inlet opening; and
   (d) second electrode means comprising a plurality of discrete electrodes electrically insulated one from another exposed to said gas and substantially circumferentially disposed at respectively discrete points displaced from said first electrode means in the direction of flow of said gas.

5. In an MHD generator for generating electricity from a moving stream of hot electrically conductive gas, the combination comprising:
   (a) means for providing said electrically conductive gas;
   (b) a substantially disk-shaped duct having a central opening for receiving said gas whereby said gas enters said duct through said central opening along a predetermined axis and substantially circumferentially leaves said duct in a direction substantially normal to said axis;
   (c) means for establishing a magnetic field through said duct normal to the direction of gas flow therein;
   (d) first electrode means exposed to said gas and carried by said duct adjacent said central opening; and
   (e) second electrode means exposed to said gas, carried by said duct and substantially circumferentially displaced from said first electrode means in the direction of flow of said gas, said electrically conductive gas comprising a monatomic gas and a substance dispersed in said gas and substantially ionizable at the temperature of said gas, said magnetic field having a flux density sufficient to provide an $\omega\tau$ in excess of about 10 at the upstream end of said magnetic field in said duct where $\omega$ is the electron cyclotron frequency in radians per second and $\tau$ is the electron mean free time between collisions with gas particles in seconds.

6. The combination as defined in claim 5 wherein the inner surface of the respective portions of said duct exposed to said gas and carrying said electrodes is substantially smooth and substantially coextensive with respectively the portions of said electrodes exposed to said gas whereby said electrodes do not substantially extend into said gas.

7. The combination as defined in claim 5 wherein said electrically conductive gas comprises a monatomic gas heated to a temperature at least about 1500° Kelvin and a substance dispersed in said gas and substantially ionizable at the temperature of said gas, said magnetic field having a flux density sufficient to provide an $\omega\tau$ in excess of about 10 where $\omega$ is the electron cyclotron frequency in radians per second and $\tau$ is the electron means free time between collisions with gas particles in seconds.

8. In an MHD generator for generating electricity from a moving stream of hot electrically conductive gas, the combination comprising:
  (a) means for providing said electrically conductive gas;
  (b) a substantially disk-shaped duct having a central opening for receiving said gas whereby said gas enters said duct through said central opening along a predetermined axis and substantially circumferentially leaves said duct in a direction substantially normal to said axis;
  (c) means for establishing a magnetic field through said duct normal to the direction of gas flow therein;
  (d) first electrode means exposed to said gas and carried by said duct adjacent the circumference of said central opening; and
  (e) second electrode means comprising a plurality of discrete electrodes electrically insulated one from another exposed to said gas, carried by said duct and circumferentially displaced from said first electrode means in the direction of flow of said gas.

9. The combination as defined in claim 8 wherein said electrically conductive gas comprises a monatomic gas and a substance dispersed in said gas and substantially ionizable at the temperature of said gas, said magnetic field having a flux density sufficient to provide a high $\omega\tau$ in said duct where $\omega$ is the electron cyclotron frequency in radians per second and $\tau$ is the electron mean free time between collisions with gas particles in seconds.

10. The combination as defined in claim 9 wherein said first and second electrode means do not project into said electrically conductive gas.

11. The combination as defined in claim 8 wherein the inner surface of the respective portions of said duct exposed to said gas and carrying said electrodes is substantially smooth and substantially coextensive with respectively the portions of said electrodes exposed to said gas whereby said electrodes do not substantially extend into said gas.

12. The combination as defined in claim 8 wherein said electrically conductive gas comprises an inert gas heated to a temperature of at least about 1500° Kelvin and a substance dispersed in said gas and substantially ionizable at the temperature of said gas, said magnetic field having a flux density sufficient to provide an $\omega\tau$ in excess of about 10 where $\omega$ is the electron cyclotron frequency in radians per second and $\tau$ is the electron mean free time between collisions with gas particles in seconds, said first and second electrodes are substantially flush with the walls in which they are carried, and said second electrode means comprises a plurality of discrete electrodes electrically insulated one from another.

13. In the method of generating electricity, the steps comprising:
  (a) injecting an easily ionizable substance into an inert gas;
  (b) heating said inert gas to a temperature at least about 1500° K. to ionize a substantial portion of said ionizable substance injected into said inert gas and render said gas electrically conductive;
  (c) circumferentially expanding said electrically conductive gas through a substantially disk-shaped duct whereby said electrically conductive gas flows through said duct in a direction substantially normal to its direction of flow at the inlet of said duct and duct and toward the outer periphery of said duct;
  (d) providing a magnetic field through said duct normal to the direction of gas flow therein; and
  (e) adjusting the gas pressure and magnetic field strength in said duct to provide nonequilibrium ionization of said gas, said magnet field having a flux density sufficient to provide an $\omega\tau$ in excess of about 10 where $\omega$ is the electron cyclotron frequency in radians per second and $\tau$ is the electron mean free time between collisions with gas particles in seconds.

14. In the method of generating electricity, the steps comprising:
  (a) injecting an easily ionizable substance into an inert gas;
  (b) heating said inert gas to a temperature sufficient to ionize a substantial portion of said ionizable substance injected into said inert gas and render said gas electrically conductive;
  (c) circumferentially expanding said electrically conductive gas through a substantially disk shaped duct whereby said electrically conductive gas flows through said duct in a direction substantially normal to its direction of flow at the inlet of said duct and toward the outer periphery of said duct;
  (d) providing a magnetic field through said duct normal to the direction of gas flow therein;
  (e) adjusting the gas pressure and magnetic field strength in said duct to provide nonequilibrium ionization of said gas; and
  (f) providing a plurality of discrete load circuits wherein current flow in said load circuits includes respectively current flow within said gas in said duct between about the beginning of said magnetic field at the inlet of said duct and discrete points electrically insulated one from another at about the end of said magnetic field.

References Cited

UNITED STATES PATENTS 3,176,169   3/1965   Neitzel _____ 310—11
3,183,379   5/1965   Hurwitz _____ 310—11

MILTON O. HIRSHFIELD, *Primary Examiner.*

DAVID X. SLINEY, *Assistant Examiner.*